United States Patent [19]

Hubbard et al.

[11] Patent Number: 4,462,139

[45] Date of Patent: Jul. 31, 1984

[54] MEAT PROCESSING MACHINE

[76] Inventors: Raymond W. Hubbard, 1746 W. Longview Ave., Stockton, Calif. 95201; Thomas W. Hubbard, 3641 W. Michigan, Stockton, Calif. 95204

[21] Appl. No.: 336,037

[22] Filed: Dec. 31, 1981

[51] Int. Cl.³ .............................................. A22C 9/00
[52] U.S. Cl. ..................................................... 17/27
[58] Field of Search ................ 17/25, 26, 27; 83/390; 99/532, 533, 510

[56] References Cited

U.S. PATENT DOCUMENTS

| | | | |
|---|---|---|---|
| 3,893,384 | 7/1975 | Lo Biondo et al. | 17/27 UX |
| 3,949,631 | 4/1976 | Goldman et al. | 83/390 X |
| 4,254,533 | 3/1981 | Lo Biondo et al. | 17/27 |
| 4,348,787 | 9/1982 | Wolff | 17/27 |

Primary Examiner—Willie G. Abercrombie
Attorney, Agent, or Firm—Bruce & McCoy

[57] ABSTRACT

A meat processing machine which has a roller for penetrating meat, a pressure plate and means for variably controlling the pressure to be exerted against the plate on pieces of meat passed between the plate and the roller.

7 Claims, 6 Drawing Figures

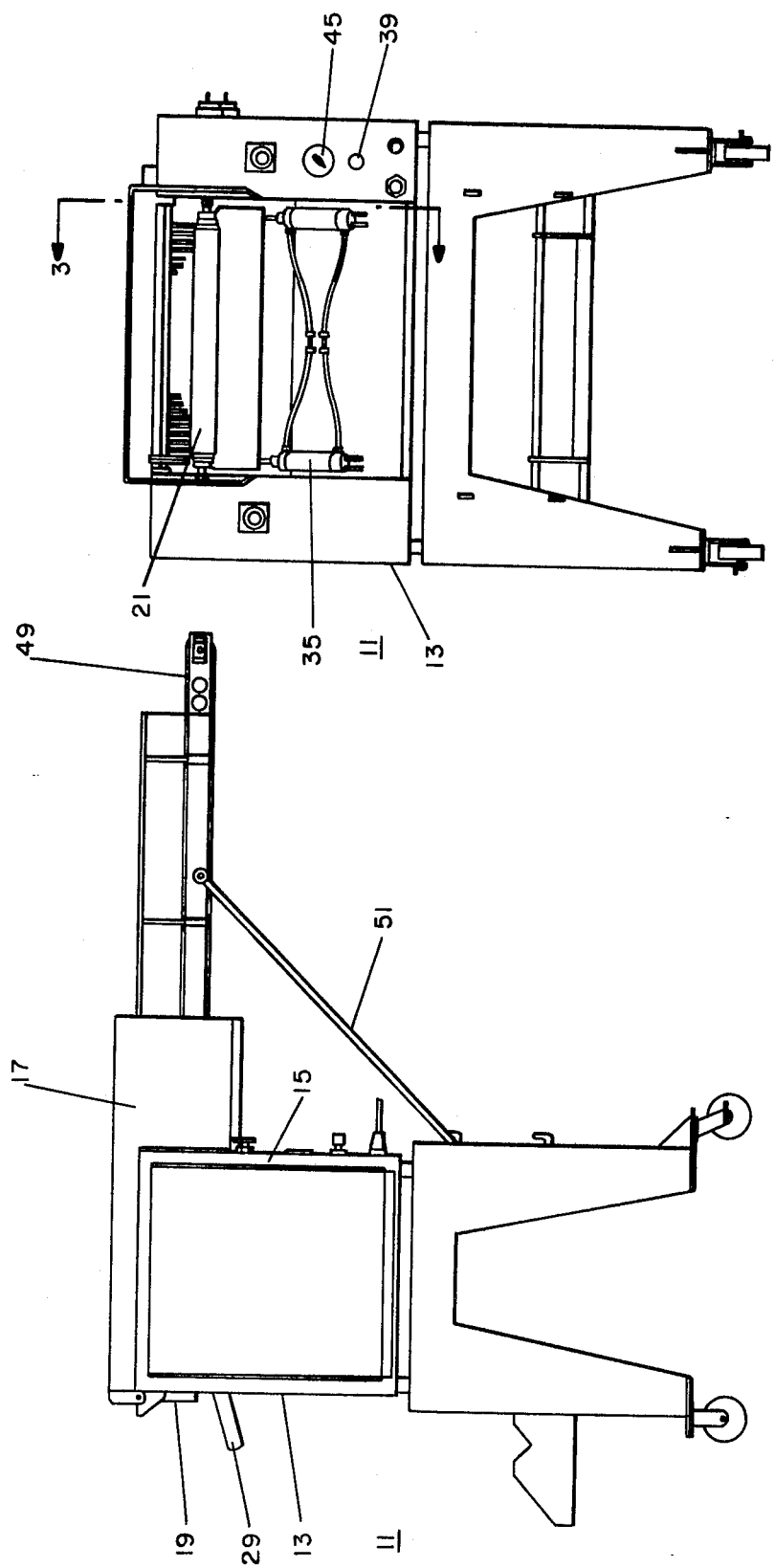

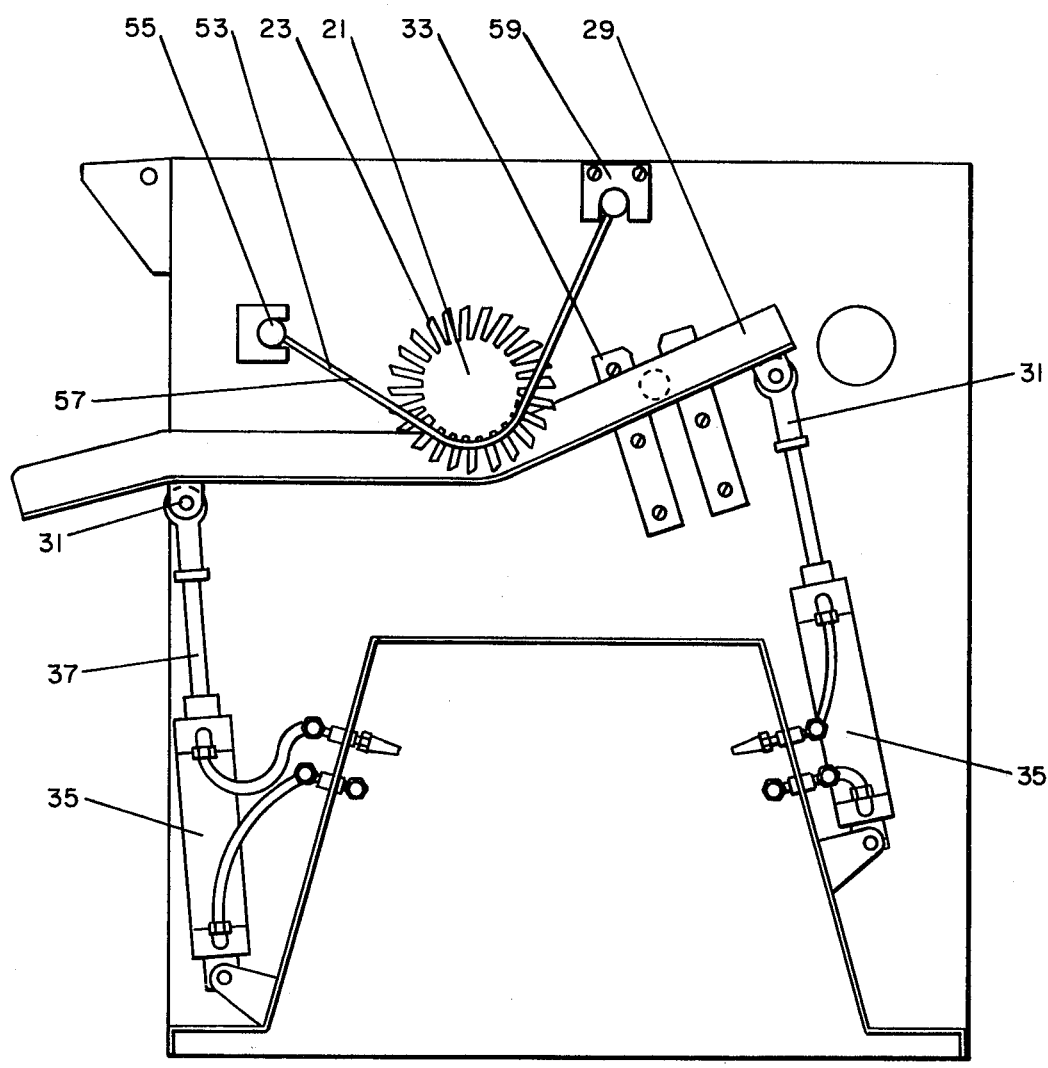
FIG.—3

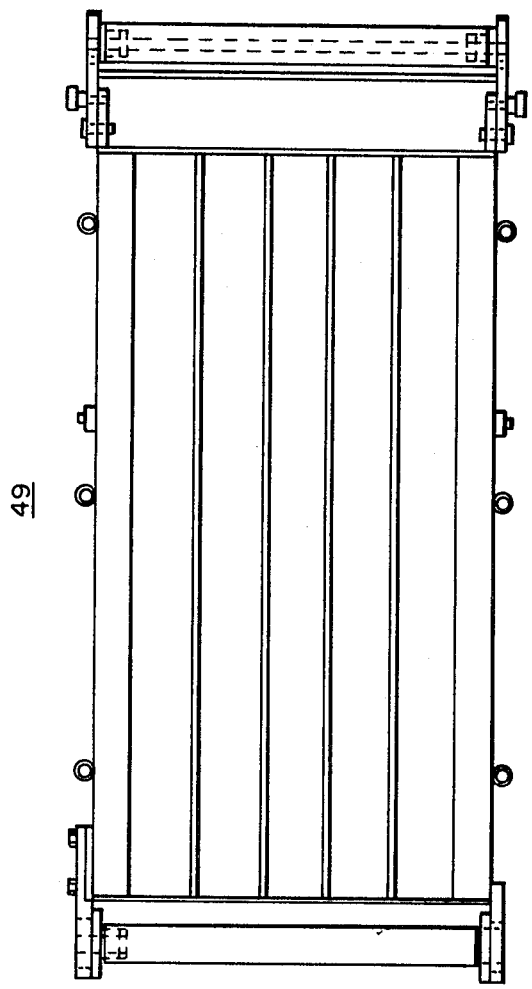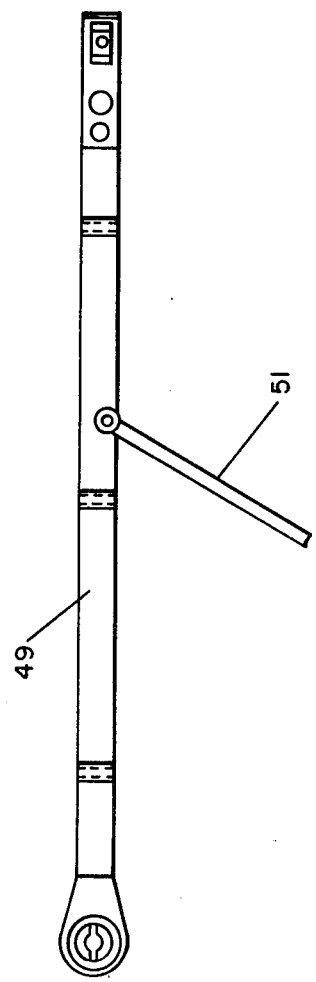
FIG.—4
FIG.—5

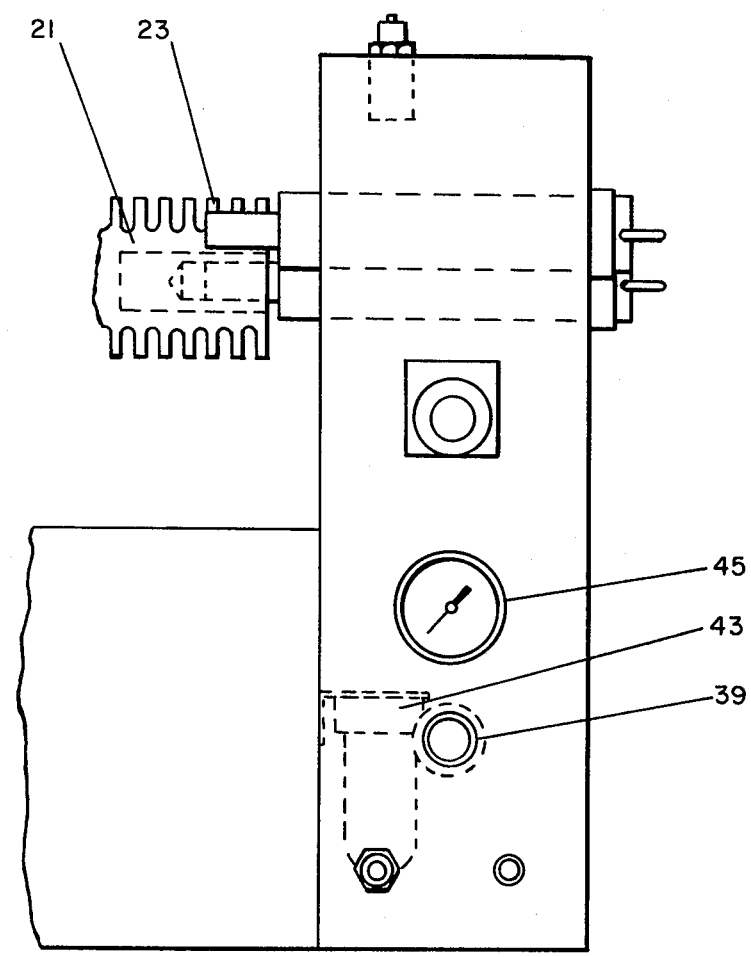
FIG.—6

MEAT PROCESSING MACHINE

BACKGROUND OF THE INVENTION

1. Field of the Invention

The present invention relates to machines for processing meat. More particularly, it relates to a processor for penetrating the meat to puncture the muscles and connective tissue of the meat, to break up rigor mortis in the meat and tenderize it, to release the meat proteins, and to affect a better distribution, retention, and absorption of the curing fluids in the meat.

2. Description of the Prior Art

For some years it has been known that if the natural proteins of the meat can be released and diffused throughout the meat, these proteins will serve as a binder when the meat pieces are pressed together and cooked so that pieces of meat and boneless meats can be reformed into an integral mass. It has also been known that puncturing, crushing, mashing, slitting, beating, massaging, tumbling and agitation of the meat in the presence of a curing solution will cause these meat proteins to be released.

The puncturing and crushing of the meat pieces which have undergone rigor mortis also has the effect of breaking the connective tissue and crushing the internal cells of the meat to make it more pliable. The puncturing of the meat also allows the curing solution to penetrate more deeply into the piece of meat where it is more uniformly absorbed, thus leading to a more consistent ultimate product.

It has been found that it is particularly desirable to puncture the meat as deeply as possible while subjecting it to pressure. If the meat is compressed while it is punctured, the cure solution will penetrate more deeply and uniformly throughout the meat even though the meat expands after the pressure is released. It has been found that deep penetration under pressure allows the meat to retain more of the cure fluids and soluble proteins during and after subsequent processing steps than by merely opening the surface of the meat.

Some of the prior art machines treat the surface of pieces of meat by passing the meat between a roller and a plate and puncturing, squeezing or slitting it. A problem with these machines is that usually the plate is disposed in a fixed position which cannot be easily adjusted, if at all, to accommodate meat pieces which are different sizes from those for which the spacing between the roller and the plate is set. Many pieces of meat will receive either an insufficient treatment from the roller or will be too large and will jam the machine.

One attempt to correct the problems resulting from the fixed plate has been to make the plate out of a flexible metal which would distort with respect to the roller when larger pieces of meat are passed between the roller and the plate. However, such a plate has been found to be limited in its durability and in the amount of pressure it could withstand. Another attempt to solve the problem was to mount a rigid heavier duty plate on springs which could be individually adjusted to change the spacing of the plate with respect to the roller for different size meats to maintain a relatively consistent pressure on each size of meat. However, such adjustments are only possible when the machine is not processing meat, and since most meat processing machines have to be regularly disassembled for cleaning each day, it has been found to be very inconvenient to reset the spring tension after each cleaning, as well as to take the time to do so whenever different sized pieces of meat were processed. The inconvenience resulted in the failure by many operators to make the required adjustments whereby processing of the meat by these machines could prove to be unsatisfactory.

There was thus a need for a machine which would allow variable pressure adjustments of the plate with respect to the roller while the machine was in operation that would still distribute uniform pressure over the entire piece of meat of varying sizes so that there would be a consistent uniform product.

Any machine which utilizes a roller to crush or open the surface of a piece of meat will also have inherent safety risks for the operators, particularly when a large volume of meat pieces is to be run through a machine at a high speed. Since meat processors must process large volumes of meat to justify the capital expenditures for equipment to remain competitive, they ordinarily demand a high volume capability of their machines.

The machine of the present invention solves these problems of the prior art and can be adjusted to uniformly squeeze and puncture pieces of meat to a maximum depth under a consistent amount of pressure regardless of the size of the meat pieces. The machine of the present invention allows the operator to quickly and easily control the pressure placed on the meat passing between the roller and the plate by a single control while the machine continues in operation. The meat is passed between a roller having sharp, radial projections and an easily adjustable variable pressure plate. When the plate is set for a relatively high pressure, it produces a deep penetration of the meat by the roller regardless of the size of the meat with a pressure which is uniformly distributed on the piece of meat. The benefits of deep penetration and even pressure results in uniformly pliable pieces of meat with a more even cure distribution, with better absorption and retention of the curing solution. This produces a more uniform and consistent product from batch to batch while still allowing a high degree of efficiency and speed in processing the meat.

The present invention also provides a solution to some of the safety problems of a high volume processing machine by the incorporation of a conveyor system with a safety cover which allows operators to load a large quantity of meat onto the conveyor for processing through the machine while minimizing their exposure to the roller when the machine is in operation. The conveyor, while reducing safety concerns, also allows more meat to be fed into the machine at one time and contributes to its efficiency.

In addition, it has been found that this machine is useful for treating meat to shorten the total processing time of subsequent tumbling or shaking and tumbling steps as described in pending U.S. patent applications, Ser. Nos. 213,533 and 213,554, wherein it is noted that this sequence of steps increases the capability of the meat to absorb and retain fluids, including soluble proteins, thus resulting in a higher yield and a more tender, uniform, and nutritious product that is firmly bonded into whole pieces.

SUMMARY OF THE INVENTION

The present invention is a meat processing machine. It includes a meat puncturing roller removably supported in a frame with a pressure plate adjustably disposed in the frame proximate the roller. A regulated air pressure means controls the pressure against the plate thereby allowing variable pressure to be exerted on pieces of meat which pass between the plate and the roller.

OBJECTS OF THE INVENTION

It is therefore an important object of the present invention to provide a meat processing machine which will simultaneously compress and penetrate variable sizes of pieces of meat safely and efficiently.

It is another object of the present invention to provide a machine which has means for easily varying the pressure which is exerted against the meat as it passes between a processing roller and a pressure plate while the machine is in operation.

It is a further object of the present invention to provide a processing machine for meat which has a pressure plate controlled by air pressure to accommodate varying sizes of meat pieces so that they will be relatively uniformly processed regardless of size.

It is yet another object of this invention to provide a conveyorized machine which safely moves boneless cured meat between a processing roller and a pressure plate to separate muscle and connective tissue and pierce the meat deeply with uniform pressure to aid in cure fluid distribution.

It is yet a further object of the present invention to provide a machine which allows variable spacing of a plate relative to a roller with constant force by means of controlling the air pressure used to hold the plate proximate the roller.

And it is a still another object of the present invention to provide a machine having a variable air pressure regulator which may be easily adjusted while the machine is in operation to vary the pressure placed on the meat being processed by the machine.

Other objects and advantages of the invention will become apparent when the following specification is considered in conjunction with the accompanying drawings.

BRIEF DESCRIPTION OF THE DRAWINGS

FIG. 1 is a side elevational view of a preferred embodiment of the present invention;

FIG. 2 is a front elevational view of the machine of FIG. 1;

FIG. 3 is a cross-sectional view taken along the line 3—3 of FIG. 2;

FIG. 4 is a top plan view of the feed conveyor of the present invention;

FIG. 5 is a side elevational view of the feed conveyer; and

FIG. 6 is an enlarged front view of a portion of the embodiment shown in FIG. 2.

DESCRIPTION OF THE PREFERRED EMBODIMENT

The meat processing machine 11 of the present invention includes a frame 13 having at least two interconnected vertical support members 15. Openings on opposite sides of the frame between the support members allow meat to be inserted into the machine on one side and discharged from the other. For safety purposes, it is obviously desirable to have as much of the remainder of the moving parts as possible closed off from the operator. In the preferred embodiment, there is a removable top guard 17 which is hingedly mounted to the frame and extends outward to cover a portion of the feed conveyor as will be described hereafter. There is also a front guard 19 hingedly attached to the discharge side of the frame. Preferably, a safety baffle will also be mounted proximate the inlet side of the frame to control the size of objects carried on the conveyor to the plate.

A roller 21 is removably supported for rotation in the frame 13 and has a multiplicity of projections 23 for penetrating and puncturing a piece of meat. The roller is mounted in the frame with a horizontal axis of rotation which is parallel to the inlet opening of the frame so that the meat which is inserted in the inlet opening is grabbed by the roller and pulled into the machine by the action of the roller. In the preferred embodiment, the roller is milled from a cylinder of continuous stainless steel and has sharp radial projections 23 which are preferably in excess of one inch long (2.54 cm) with spaces between projections so that the treated meat will have a grid or waffle pattern of puncture indentations. In practice it appears to be preferable to puncture the meat as deeply as possible while squeezing it under pressure. Although the roller described herein is part of the preferred embodiment, other types of rollers may be employed in the design of the present invention which treat the meat to make it pliable and release the proteins.

A pressure plate 29 is adjustably disposed in the frame 13 proximate the roller 21. This plate, in the preferred embodiment, is mounted in the frame at an angle with respect to the horizontal with the upper end of the plate being disposed on the inlet side of the roller. The plate 29 is elongated and rigid and has flanges or sidewalls on each side along the length thereof to form a chute. Although the plate could be disposed in any position relative to the roller that would allow meat to pass therebetween, in the preferred embodiment the rigid elongated plate is disposed in the frame at least in part below the roller for best efficiency. The plate may extend outside the openings in the frame, both on the inlet side, when the embodiment does not include a feed conveyor, and on the discharge side. The plate is preferably constructed to resist distortion from the pressure caused by the action of the roller 21 on the pieces of meat which are passed between the plate and the roller. When the machine is in operation, the plate floats with respect to the roller to permit thicker pieces of meat to pass through without jamming the machine. Proximate the upper end of the plate, guides 33 are disposed in the support members of the frame so that the plate can move with respect to the roller in a predetermined track. When at rest, the pressure plate is positioned against stops so that it will be ¼ inch (0.635 cm) from the periphery of the roller 21.

A regulated air pressure means is provided for controlling the pressure against the plate 29 whereby variable pressure can be exerted on the pieces of meat which are passed between the plate and the roller 21. The regulated air pressure means includes at least one cylinder 35 adjustably secured to the plate and disposed to hold the plate proximate the roller with adjustable pressure. In the preferred embodiment a plurality of cylinders 35 support the plate with at least two cylinders secured to the plate on opposite sides of the roller. Preferably a pair of air cylinders support each end of the plate: one pair is disposed proximate the inlet side of the plate, on the bottom thereof and at each corner, and another pair is mounted underneath the plate proximate the discharge end. The air cylinders 35 allow the plate to move away from the roller so that varying sizes of pieces of meat can pass between the plate and the roller. The air cylinder connecting shafts 37 which engage the plate hold it in position proximate the roller. The shafts are secured to the plate with swivel connections 31, pivot means, or other adjustable connection means.

A means is provided for controlling the pressure to the air cylinder(s) 35 by the machine operator. By regulating the air pressure supplied to the cylinders, the pressure plate can be controlled to apply different pressures to the meat pieces passing between the plate and the roller. In the preferred embodiment, a single variable air pressure regulator 39 controls the air pressure supplied to all of the air cylinders so that each cylinder receives the same pressure. The air supply for the cylinders is preferably cycled through an air filter 43 before it passes to the variable air regulator 39. An air pressure gauge 45 is provided to indicate to the operator the air pressure being supplied to the machine.

In the preferred embodiment a feed conveyor 49 is provided which is disposed adjacent the upper end of the elongated plate 29 whereby meat pieces can be placed on the conveyor and discharged onto the plate and automatically fed under the roller 21. The feed conveyor includes a removable cover 17 for at least a portion of the conveyor length adjacent the pressure plate. The conveyor is mounted on the inlet side of the roller and may be supported by a strut 51 mounted between the frame 13 and the underside of the conveyor. The feed conveyor may be adjustably mounted with respect to the horizontal to accommodate to the processor's needs through a range of at least a 30° incline.

A comb 53 is provided to strip the processed meat from the roller. It is mounted to the frame 13 of the machine and has two elongated cross bars 55 and a plurality of connecting rods 57. The rods are secured at each of their ends to the elongated bars, and the comb is mounted so that the rods are disposed between the projections 23 of the roller 21 on the side of the roller adjacent the pressure plate 29 to deflect pieces of meat from the roller onto the discharge end of the plate. The comb is secured to the frame by quick release latches 59 for easy removal.

Thus, the machine of the present invention provides an improved machine which is a solution to the problems of the prior art meat processing machines. The combination of the rigid elongated pressure plate supported by adjustable regulated air pressure pistons and disposed in spaced relation to a roller having radial meat puncturing projections makes it possible for the first time to easily uniformly process different sized pieces of meat by adjusting the pressure exerted against the plate and thereby against the meat which passes between the plate and the roller so that all of the pieces of meat passing through the machine will experience a uniform puncturing, penetration, and compression treatment. This action creates deep impressions in the meat which effect is residual to some extent after the meat emerges from passing between the roller and the pressure plate in a substantially more pliable condition. It is believed that, as a result, while the meat remains in its softened condition, the cure solution and the meat proteins diffuse through the meat due to the compression and puncturing. This diffusion of the meat proteins and the cure solution is substantially uniform throughout the meat, and the meat also shows a surprisingly improved capability of retaining the soluble proteins and cure fluids upon further processing. If the meat is thereafter tumbled and shook, additional liquids can even be added and will be absorbed by the meat after it has been treated by the machine of this invention. Meat treated by both penetration and compression in the present invention, followed by tumbling, produces a meat product which bonds together as a whole piece of meat during cooking or smoking and produces a moister and more nutritious product.

The regulated air pressure support for the pressure plate of the present invention makes it possible to easily and uniformly adjust the pressure exerted against the meat, even while the machine is in operation, which in combination with a feed conveyor and the built in safety features of the machine, make this meat processor a machine particularly beneficial to large volume processing of meat while increasing quality and consistency between batches and fluid retention regardless of the sizes of meat being processed. The present invention permits continuous operation due to the controllable air pressure activation of the pressure plate.

While the invention has been described in considerable detail, it is not to be limited to the specific features set forth herein except as may be necessitated by the appended claims.

We claim:
1. An improved meat processing machine comprising
    a frame,
    a roller removably supported in said frame for rotation and having a multiplicity of projections disposed thereon for penetrating a piece of meat,
    a floating pressure plate adjustably disposed in said frame proximate said roller,
    at least one pressure responsive telescoping cylinder adjustably secured to said plate and disposed to hold said plate proximate said roller with adjustable pressure, and
    means for controlling the force with which the cylinder holds the plate proximate said roller in response to pressure applied to said plate and said cylinder by meat being processed between said roller and said plate.
2. The machine of claim 1 wherein a plurality of said cylinders support said plate with at least two of said cylinders secured to said plate on opposite sides of said roller for controlling the forces exerted against both ends of said plate.
3. The meat processing machine of claim 2 wherein said machine further includes a feed conveyor disposed adjacent the intake end of said plate whereby meat pieces can be placed on said conveyor and discharged onto said plate and automatically fed between said roller and said plate, said feed conveyor including a removable cover covering at least the portion of said conveyor length adjacent said plate and the intake of said machine to prevent the operator's hands from being inserted between said roller and said plate.
4. An improved processing machine comprising
    a frame,
    a roller removably supported in said frame and having a multiplicity of projections formed thereon for penetrating a piece of meat,
    a floating pressure plate adjustably disposed in said frame at least in part below and proximate said roller,
    means for guiding the displacement of said floating pressure plate with respect to said roller,
    a plurality of telescoping cylinders adjustably supporting said plate with at least two of said cylinders secured to said plate on opposite sides of and approximately equidistant from said roller, and means for controlling the force with which said cylinders hold said plate proximate said roller by regulating the pressure supplied to said cylinders.

5. An improved meat processing machine comprising a frame, a roller removably supported in said frame and having a multiplicity of projections formed thereon for penetrating a piece of meat, a rigid elongated floating pressure plate adjustably mounted in said frame below and proximate said roller and at an angle with respect to the horizontal with the upper end of said plate being disposed on the inlet side of said roller, said plate having flanges along the length thereof to form a chute, means for guiding the displacement of said floating pressure plate with respect to said roller, a plurality of telescoping cylinders adjustably supporting said plate with at least one pair of said cylinders secured to said plate on each side of said roller approximately equidistant therefrom, said cylinders being disposed and supporting said plate from below, and means for supplying regulated pressure to said cylinders with the control for regulating said pressure being operable by the operator of said machine from a single control.

6. The meat processing machine of claim 5 wherein said machine further includes a feed conveyor disposed adjacent to the upper end of said plate whereby meat pieces can be placed on said conveyor and discharged onto said plate and automatically fed between said roller and said plate, said feed conveyor including a removable cover covering at least the portion of said conveyor length adjacent said plate to prevent the operator's hands from being inserted between said roller and said plate.

7. An improved meat processing machine comprising a frame, a roller removably supported in said frame for rotation and having a multiplicity of sharp radial projections formed thereon for penetrating a piece of meat substantially therethrough.

a rigid elongated floating pressure plate adjustably disposed in said frame below and proximate said roller and at an angle with respect to the horizontal whereby the upper end of said plate is disposed on the inlet side of said roller, said plate having flanges along the length thereof forming a chute, a pair of guide slots secured to said frame and disposed adjacent the floating pressure plate, a pair of pins extending laterally from said floating pressure plate and engaging said slots and reciprocating therein as said plate is displaced with respect to said roller, two pair of air cylinders adjustably supporting said plate from below, one pair of said cylinders disposed proximate the inlet end of said plate and the other pair of said cylinders disposed proximate the discharge end of said plate, said pairs of air cylinders being secured to said plate approximately equidistant on opposite sides of said roller, means for supplying regulated air pressure to said cylinders, a variable air pressure regulator having a single control for controlling the air pressure supply to all of said air cylinders, and a feed conveyor disposed adjacent to the upper end of said floating pressure plate and adjustable with respect to the horizontal whereby meat pieces can be placed on said conveyor and discharged onto said plate and automatically fed between said roller and said plate, said conveyor including a removable cover covering at least the portion of said conveyor length adjacent said plate and the intake of said machine to prevent the operator's hands from being inserted between said roller and said plate.

* * * * *